Aug. 25, 1931.  J. H. FLAGG  1,820,061
SPEED CHANGE UNIT
Filed Nov. 26, 1930
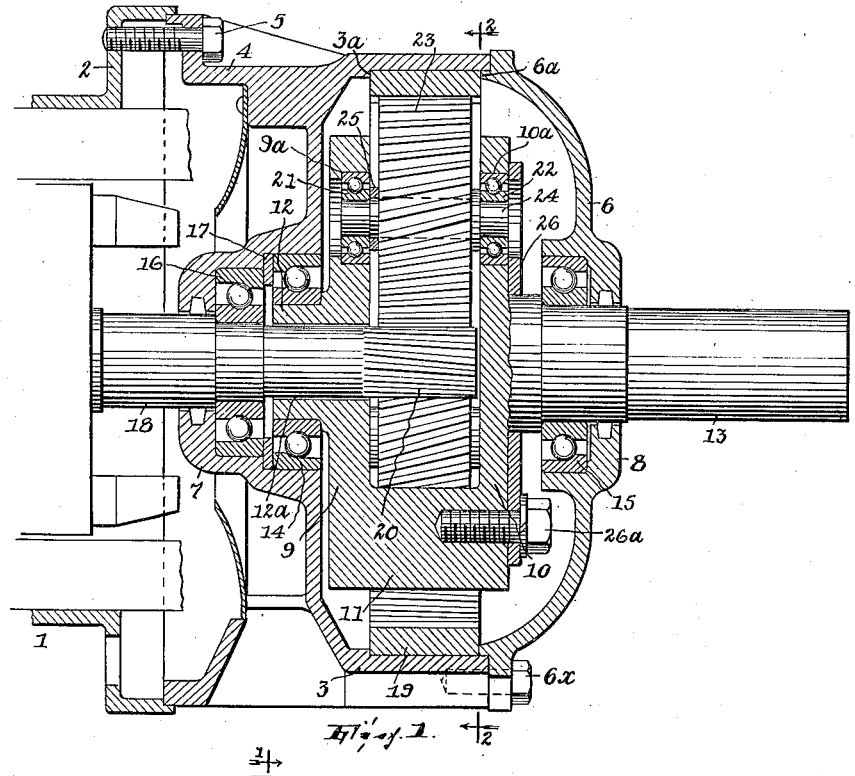
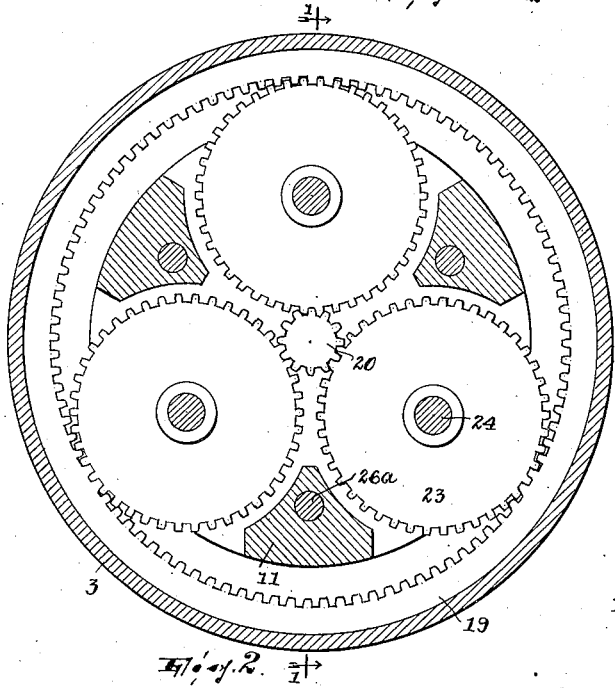
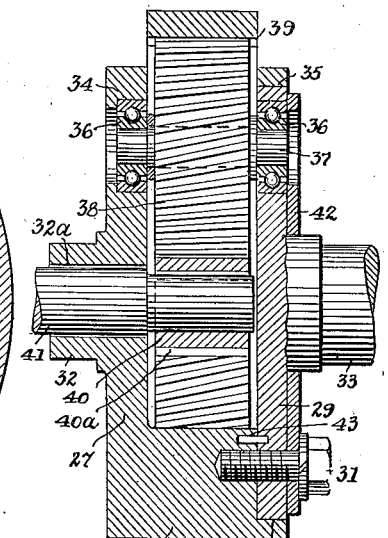
Inventor,
John H. Flagg.
By his Attorney Patented Aug. 25, 1931

1,820,061

UNITED STATES PATENT OFFICE

JOHN H. FLAGG, OF ORADELL, NEW JERSEY, ASSIGNOR TO WATSON-FLAGG MACHINE COMPANY, OF PATERSON, NEW JERSEY, A CORPORATION OF NEW JERSEY

SPEED CHANGE UNIT

Application filed November 26, 1930. Serial No. 498,258.

This invention relates to speed-change units and it consists in certain improvements therein designed to increase the strength, durability and the efficiency of such mechanisms in the respects hereinafter pointed out.

In the drawings,

Fig. 1 is a section on line 1—1, Fig. 2;

Fig. 2 is a section on line 2—2, Fig. 1; and

Fig. 3 is a section in the same plane as Fig. 1 of a modified form of the unit, with the casing removed.

A motor is shown at 1. 2 is a flange thereon to which the improved unit may be affixed.

The casing of the unit comprises a main annular shell 3, which is open at one side and at the other or closed side has a supporting flange 4 which fits and has a rabbet engagement with the motor flange 2 and is rigidly secured to said flange by screws 5, and a minor shell or cover 6 which covers and has a rabbet engagement with the open side of shell 3 and is secured thereto by screws 6x. The central portion of shell 3 has a hub 7 projecting toward the motor and the central portion of shell 6 is thickened to form a hub 8, both hubs being apertured in alinement with each other. The casing is adapted to contain liquid lubricant at such a depth that the enclosed rotary system is partially immersed therein.

The casing contains a cage which in the form shown in Figs. 1 and 2 is a one-piece circular body of suitable thickness comprising, essentially, two disks or heads 9 and 10 integrally joined at equidistant points by sector-shaped lugs 11 and having, respectively, the axial hub 12 and shaft 13 integral with the cage, the hub having an axial bore 12a. Casing hubs 7 and 8 are counterbored at the inside to receive thrust ball-bearings 14 and 15 for the hub 12 and shaft 13 of the cage, which is thus journaled in the casing.

In a counterbore in hub 7 outward of and open to the counterbore for bearing 14 is a bearing (here a thrust ball-bearing) 16 between which and bearing 14 there may be a spacer ring 17. Bearing 16 receives a shaft 18 which extends into the cage through its hub-bore 12a, with clearance between it and said bore; this shaft may be an integral extension of the motor shaft, or in some way coupled thereto to rotate therewith.

The casing has a non-rotative annulus 19 formed with interior teeth and thus forming an annular gear; this gear, which is concentric with hubs 7 and 8 and hence with the cage, is held fixed against axial displacement in either direction by and between interior shoulders 3a and 6a of the casing-shells. Shaft 18 has within the cage a pinion 20 the teeth of which may be formed directly on the shaft.

The cage-head 9 is counterbored from the inside at points equidistant from each other and the axis of the cage, as at 9a, to receive bearings 21. In registry with the counterbores 9a the head 10 is bored at 10a, receiving in such bores the bearings 22. Both of these bearings are here plain ball-bearing, each including a pair of concentric races and interposed balls, as shown. Intermediate or planet gears 23, alternating with the lugs 11, mesh with the annular gear 19 and pinion 20. These are provided with trunnions 24 which are fast against displacement axially of the gear in each case as by being the projecting ends of a shaft driven into the same, and they form axially extending bearing-portions thereon journaled in the bearings 21—22. There may be an annular spacer 25 between each side face of a gear and the adjoining bearing and penetrated by the trunnion. When the gears, their trunnion-forming shafts, the spacers and the bearings 21—22 have been assembled with the cage a disk 26 is applied to the outer face of cage-disk 10, being held in place by the screws 26a.

In Fig. 3 the cage has one head 27 thereof formed with the integral lugs 28 but the other head 29 is separable therefrom, being simply fitted into a rabbet 30 formed in the outer ends of said lugs and rigidly held thereto by screws 31. Heads 27 and 29 respectively have the axial hub 32 and shaft 33 corresponding to hub 12 and shaft 13 of Fig. 1; also, in alternation with the lugs, the opposed counterbores 34 and bores 35 to receive the bearings 36 for the trunnions 37 of the planet gears 38 meshing with the fixed annular gear 39 and the pinion 40 which is fixed on the shaft 41 (corresponding to shaft 18) which extends, with clearance, through the bore 32a of hub 32; and the disk 42 may be present and held in place by the screws 31 the same as and to function like disk 26 in Fig. 1. For insuring accurate registry of the bearings 36 of the two heads in assembling the latter they may be doweled together, as at 43. This construction, while it preserves the cage practically equivalent to an integral body as in Figs. 1 and 2 (because the snug fitting of head 29 within the integral lugs of head 27 prevents any relative displacement of said heads radially and the screws 31 bind them rigidly together against any relative rotative displacement of the heads) also permits the assembly of pinion 40 with the cage in those cases where the pinion is of greater diameter than bore 32a, to wit, by forming it separately from the shaft and keying it thereon, as at 40a.

Whether the power be applied to shaft 18 (or 41), as in Fig. 1, or to shaft 13 (or 33) the gearing operates as a planetary system to transmit rotary motion to the other of these shafts; in the first case the pinion 20 (40) rotates the planet gears which roll in engagement with annular gear and thus rotate the cage and shaft 13 (33), and in the second case the latter shaft and the cage move the planet gears around and as they roll in engagement with the annular gear they rotate the shaft 18 (41).

In these structures, on account of the various forces and strains developed, especially with respect to the planet gears, which rotate at relatively high speed, it is known that particular attention should be given to the mounting of these gears. Of course, if the cage is constructed so that means such as lugs 11, independent of the bearing devices for the planet gears, rigidly joins the two heads of the cage a very appreciable step toward mechanical perfection will have been attained. But if the gearing is of the helical-tooth type there is still to be taken into account that each of the gears (as 19 and 20) which engages a planet gear tends to shift this gear length-wise of its axis. This is of course counteracted in a mechanism of the instant class by the other of the two mentioned gears exerting a contrary axial effort on the planetary gear, but then there arises the fault that as the result of the opposing forces exerted by the other two gears the planet gear is subjected to a tipping moment or couple, that is, so that its axis is in some way displaced from parallel with the main axis of the unit. It has been proposed to avoid this tipping by forming the planet gear with reverse helical teeth cut reversely helical. This not only adds greatly to the expense but it increases the weight and friction. According to my invention I use a single-helical gear for each of the gears 19, 20 and 23 (by which I mean a gear having teeth of single or non-reverse pitch) and I afford on the cage a bearing support for each planet gear externally thereof (as at 24—37) that holds the planet-gear against the tipping moment or couple.

In both forms herein shown each planet gear and its bearing are held against axial displacement in one direction by the element 26 (42) as a keeper, (and here in the other direction by a shoulder formed by the end of the counter-bore 9a or 34); when the keeper is removed the near bearing may be removed, the trunnion-forming shaft driven out of the gear, thus leaving the latter removable from the cage, and finally the other bearing removed, and in the second form this may be done without disturbing head 29.

Having thus fully described my invention what I claim is:

1. A speed-change unit comprising, in combination, a supporting structure having an internally toothed gear, a cage revoluble in said structure concentrically with the gear and including two spaced heads rigidly secured together, one head having an axially projecting shaft, another shaft revoluble coaxially with the first shaft and projecting through one head and having a toothed portion between the heads, said heads having opposed bores, removable bearings in said bores, planet gears between the heads meshing with the first gear and said toothed portion, and shafts axially penetrating and removable from the planet gears and having their ends projecting therefrom and journaled in said bearings, said cage having means for each head, outwardly opposing and common to all said bearings in such head, to confine the same against outward displacement in the bores, one of said means being removable to permit removal of the adjoining bearings.

2. A speed change unit comprising in combination a supporting structure having a single internal gear with single helical teeth, a rotatable member including a single helical gear with external teeth, a rotatable cage, a planet gear having helical teeth that at one point engage with the teeth of the internal gear and at another point engage with the teeth of the external gear, the thrust created by one of said latter gears on the planet gear being opposed to and substantially neutralized by the thrust of the other of said latter gears and thereby creating a tipping moment or couple on said planet gear, and means for rotatably supporting said planet gear on the cage and opposing said tipping moment or couple.

3. A speed change unit comprising in combination a supporting structure having a single internal gear with single helical teeth, a rotatable member including a single helical gear with external teeth, a rotatable cage having spaced heads, a planet gear having helical teeth that at one point engage with the teeth of the internal gear and at another point engage with the teeth of the external gear, the thrust created by one of said latter gears on the planet gear being opposed to and substantially neutralized by the thrust of the other of said latter gears and thereby creating a tipping moment or couple on said planet gear, and trunnions projecting beyond the planet gear and having journal bearings in the heads of the cage, said trunnions and bearings constituting means for rotatably supporting the planet gear and opposing said tipping moment or couple.

In testimony whereof I affix my signature.

JOHN H. FLAGG.